United States Patent [19]
Sistare

[11] Patent Number: 4,999,916
[45] Date of Patent: Mar. 19, 1991

[54] CIRCULAR SAW BASE ANGLE ADJUSTMENT MECHANISM

[75] Inventor: James R. Sistare, Pickens, S.C.

[73] Assignee: Ryobi Motor Products Corp., Pickens, S.C.

[21] Appl. No.: 568,840

[22] Filed: Aug. 17, 1990

[51] Int. Cl.[5] ........................ B23D 47/00; B27B 9/02
[52] U.S. Cl. ........................ 30/376; 30/391
[58] Field of Search ........................ 30/374–376, 30/388, 390, 391

[56] References Cited

U.S. PATENT DOCUMENTS 3,245,439 4/1966 Shens et al. .......... 30/376
4,628,604 12/1986 Fuchs .......... 30/390
4,856,394 8/1989 Clowers .......... 30/391

*Primary Examiner*—Douglas D. Watts
*Attorney, Agent, or Firm*—David L. Davis

[57] ABSTRACT

A mechanism for adjusting the angle of the base of a circular saw relative the saw blade includes an adjustment bracket having an elongated adjustment aperture which extends over both ranges of angular adjustment. For the first range, the aperture follows a first circular arc at a first radial distance from the pivot axis of the base relative the housing and for the second range the aperture follows a second circular arc at a second radial distance from the pivot axis.

6 Claims, 2 Drawing Sheets

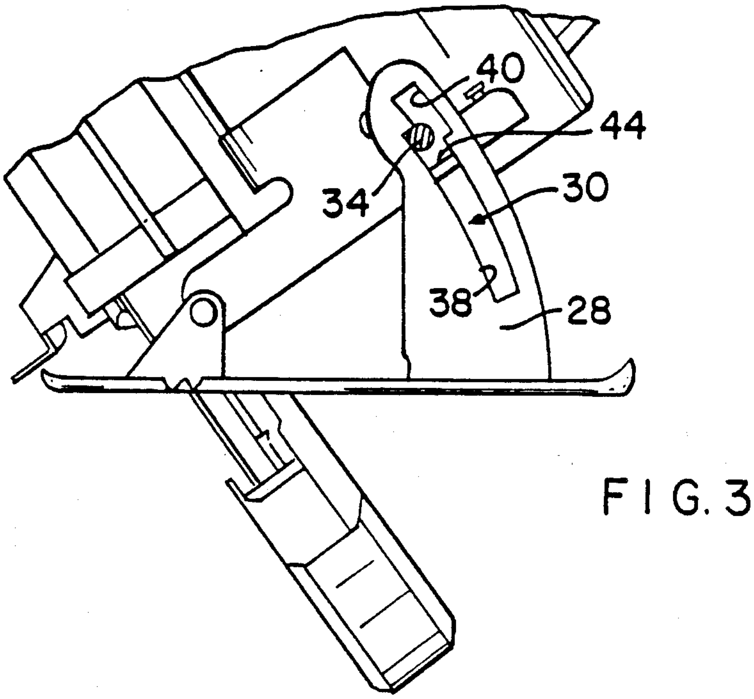
FIG. 3
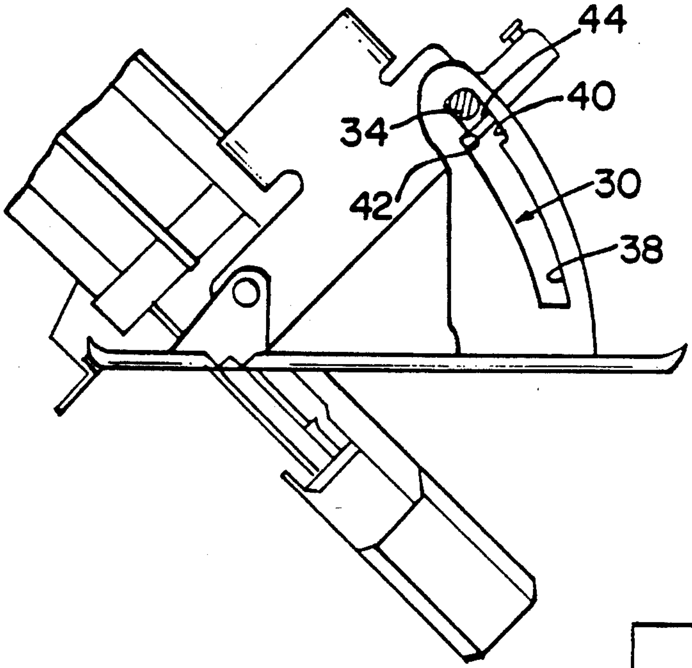
FIG. 4
FIG. 5
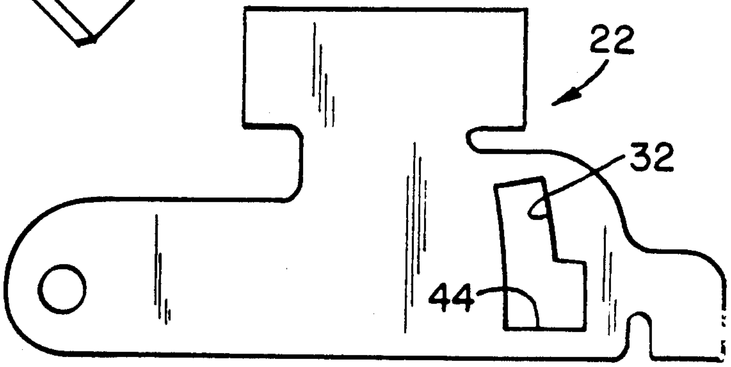

CIRCULAR SAW BASE ANGLE ADJUSTMENT MECHANISM

BACKGROUND OF THE INVENTION

This invention relates to circular saws and, more particularly, to a mechanism for adjusting the angle of the base of the saw relative the saw blade.

Circular saws are conventionally constructed with a housing containing a motor coupled to drive a circular saw blade, and a base mounted on the housing for supporting the saw on a work piece being cut. Usually, the base is mounted on the housing for pivoting movement about an axis parallel to the saw blade so that the angle of the base relative the saw blade may be adjusted to effect a desired angle of cut in the work piece. The usual range of adjustment of the base relative the saw blade encompasses 45°, that is, the base may be adjusted from an angle of 90° to the saw blade to an angle of 45° to the saw blade. For most applications, this range is adequate. However, in the construction of housing with a hip roof, a standardized angle of 38.5° is required. (It is to be noted that, according to standard convention, the condition where the base is at an angle of 90° to the saw blade is referred to as the home, or 0° angle, so that the condition where the base is at an angle of 38.5° to the saw blade is referred to as an angle of 51.5°. However, in the following description, all references are to the actual angular relation of the base relative the saw blade.) It is therefore an object of this invention to provide a mechanism in a circular saw for adjusting the angle of the base relative the saw blade in a range from 90° to 38.5°.

The aforementioned angle of 38.5° is used relatively rarely, with the most common range still being from 90° to 45°. Within that common range, the most common angles of cut are 90° and 45°. Accordingly, it is a further object of this invention to provide a mechanism in a circular saw for adjusting the angle of the base relative the saw blade wherein the common angles of cut are easily set.

SUMMARY OF THE INVENTION

The foregoing, and additional, objects are attained in accordance with the principles of this invention in combination with a circular saw having a housing containing a motor coupled to drive a circular saw blade and a base mounted on the housing for pivoting movement about an axis parallel to the saw blade for supporting the saw on a work piece being cut, by providing a mechanism for adjusting the angle of the base relative the saw blade comprising a pivot bracket fixedly mounted on one of the base and the housing, an adjustment bracket fixedly mounted on the other of the base and the housing, the adjustment bracket having an elongated aperture therethrough, and clamping means cooperating with the adjustment bracket aperture for selectively clamping the pivot and adjustment brackets to effect a desired angular orientation of the base relative the saw blade, wherein the elongated aperture of the adjustment bracket has a first portion curved to follow a first circular arc centered at the pivot axis of the base to the housing within a first range of angular orientation of the base relative the saw blade and has a second portion curved to follow a second circular arc centered at the pivot axis of the base to the housing within a second range of angular orientation of the base relative the saw blade beyond the first range, the first circular arc being at a first radial distance from the pivot axis and the second circular arc being at a second radial distance from the pivot axis.

In accordance with an aspect of this invention, the pivot bracket is formed with an aperture therethrough, the clamping means includes a member extending through the pivot bracket aperture and the adjustment bracket aperture, and the first and second portions of the adjustment bracket aperture are connected at an offset region overlapping the first and second ranges of angular orientation of the base relative the saw blade.

In accordance with another aspect of this invention, the first range is from 90° to 45° and the second range is from 45° to 38.5°.

BRIEF DESCRIPTION OF THE DRAWINGS

The foregoing will be more readily apparent upon reading the following description in conjunction with the drawings in which like elements in different figures thereof have the same reference numeral and wherein:

FIG. 3 is a partial front view of the saw of FIG. 1, with the clamping nut removed, wherein the base is set at an angle of 45° to the saw blade;

FIG. 4 is a partial front view of the saw of FIG. 1, with the clamping nut removed, wherein the base is set at an angle of 38.5° to the saw blade; and FIG. 5 is a front view of the pivot bracket of the saw shown in FIG. 1.

DETAILED DESCRIPTION

Figure 1:
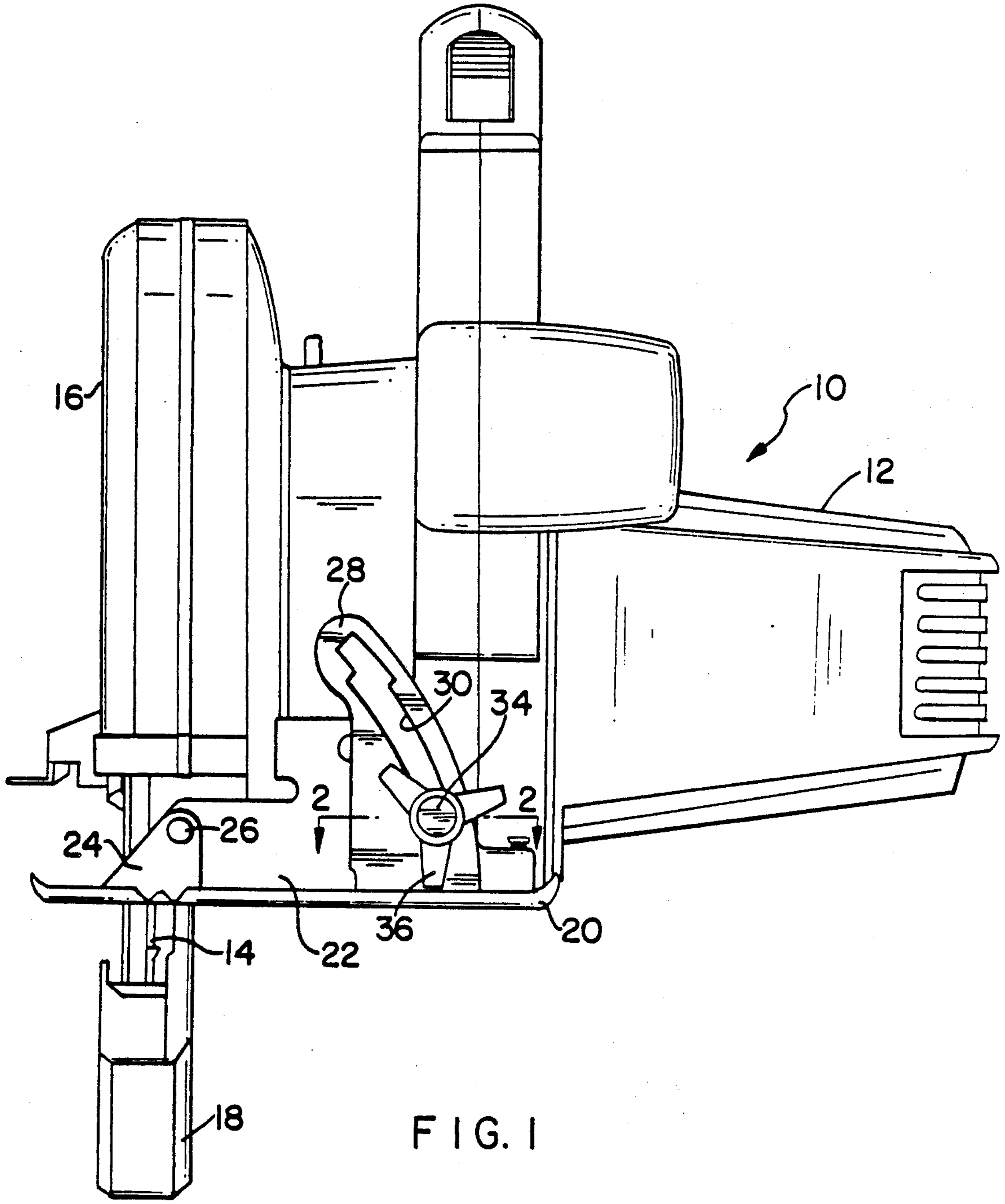
FIG. 1 is a front view of a circular saw constructed in accordance with the principles of this invention wherein the base is set at an angle of 90° to the saw blade.

Referring to the drawings, FIG. 1 shows a circular saw, designated generally by the reference numeral 10, which has a base angle adjustment mechanism constructed according to this invention. As is conventional, the saw 10 has a housing 12 containing a motor (not shown), the output shaft of which is connected to an output spindle on which is mounted a circular saw blade 14. To protect the user, a fixed upper blade guard 16 is mounted on the housing 12 and a lower blade guard 18 is supported for pivoting motion about the axis of the output spindle.

A base 20 is mounted on the housing 12 for supporting the saw 10 on a work piece to be cut by the blade 14. In order to provide for different angles of cut to be made in the work piece, the base 20 is mounted on the housing 12 for pivoting movement about an axis which is parallel to the plane of the saw blade 14. To effect this pivotable mounting, a pivot bracket 22 is mounted on the housing 12 and is pivotably connected to an upstanding tab 24 by a pivot pin 26 which lies along the pivot axis. The tab 24 is preferably formed as part of the base 20. Similar mounting structure is provided at the rear of the saw 10, with the pivot pin of the rear mounting structure being co-linear with the pivot pin 26 along the pivot axis which is parallel to the plane of the saw blade 14.

Figure 2:
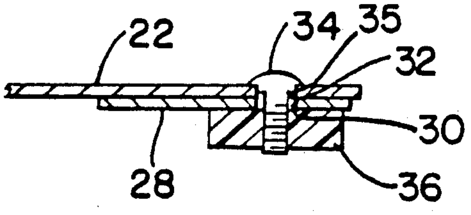
FIG. 2 is a cross-sectional view taken along the line 2—2 in FIG. 1.

In order to effect a desired angular adjustment of the base 20 relative the saw blade 14, and maintain that adjustment for as long as desired, an adjustment bracket 28 is fixedly mounted to the base 20. Preferably, the base 20 is formed from sheet stock and both the tab 24 and the adjustment bracket 28 are cut from the base and bent upwardly perpendicular thereto. The adjustment bracket 28 has an elongated aperture 30 therein. The pivot bracket 22 is also formed with an aperture 32 therein and a clamping arrangement, including a threaded bolt 34 and a hand tightenable clamping nut 36, is utilized for holding the brackets 22, 24 so that the base 20 and saw blade 14 have the desired angular relationship. As best shown in FIG. 2, the bolt 34 has a squared shoulder 35 which cooperates with the side walls of the aperture 3 to prevent rotation of the bolt 34.

According to this invention, the elongated aperture 30 of the adjustment bracket 28 has a first portion 38 curved to follow a first circular arc centered at the pivot axis of the base 20 to the housing 12 (i.e., the pivot pin 26) and has a second portion 40 curved to follow a second circular arc centered at the pivot axis of the base 20 to the housing 12. As previously described, the first portion 38 of the aperture 30 allows angular adjustment within the range from 90° to 45° and the second portion 40 of the aperture 38 allows angular adjustment within the range from 45° to 38.5°. Since the first angular range is the most commonly used range and since it is desired to provide an easy angular setting of the saw 10 at the two extremes of this first range, the first portion 38 and the second portion 40 of the aperture 30 are offset from each other. This is accomplished by arranging the first portion 38 at a first radial distance from the pivot pin 26 and the second portion 40 at a second radial distance from the pivot pin 26. Thus, the end of the first portion 38 of the aperture 30 acts as a stop abutment 42 which allows for a quick setting of the 45° angle at the end of the first range.

To allow movement of the bolt 34 in a radial direction when an adjustment is made which requires going between the first range and the second range, the aperture 32 in the pivot bracket 22 is formed with a portion 44 which extends radially in superposition to the first and second portions 38, 40 of the adjustment bracket aperture 30.

Thus, when an operator desires to set the angular adjustment of the base 20 relative the saw blade 14, the clamping nut 36 is first loosened. For setting the angle at either 90° or 45°, the ends of the first portion 38 of the aperture 30 can be used as stops for the bolt 34 and then the clamping nut 36 is tightened. For an angular adjustment within the first range from 90° to 45°, such adjustment is made with the bolt 34 within the first portion 38 of the aperture 30 and then the clamping nut 36 is tightened. If it is desired to then set the angular adjustment within the second range from 45° to 38.5°, the clamping nut is loosened, the adjustment to 45° is made, the bolt 34 is moved outwardly in the offset region of the aperture 30 and the portion 44 of the aperture 32, and further adjustments are made before tightening the clamping nut 36. Typically, the angular adjustment within the second range will be at the end thereof (i.e., 38.5°) so that the end of the second portion 40 of the aperture 30 may be utilized as a stop.

Accordingly, there has been disclosed an improved mechanism for adjusting the angle of the base of a circular saw relative the saw blade within two ranges of such angular adjustment. While an illustrative embodiment of the present invention has been disclosed herein, it will be apparent to those of ordinary skill in the art that various modifications and adaptations to that embodiment are possible and it is only intended that the present invention be limited by the scope of the appended claims.

I claim:

1. In combination with a circular saw having a housing containing a motor coupled to drive a circular saw blade and a base mounted on the housing for pivoting movement about an axis parallel to the saw blade for supporting the saw on a work piece being cut, a mechanism for adjusting the angle of the base relative the saw blade, comprising:
   - a pivot bracket fixedly mounted on one of the base and the housing;
   - an adjustment bracket fixedly mounted on the other of the base and the housing, said adjustment bracket having an elongated aperture therethrough; and
   - clamping means cooperating with the adjustment bracket aperture for selectively clamping said pivot and adjustment brackets to effect a desired angular orientation of said base relative said saw blade;
   - wherein said elongated aperture of said adjustment bracket has a first portion curved to follow a first circular arc centered at the pivot axis of the base to the housing within a first range of angular orientation of the base relative the saw blade and has a second portion curved to follow a second circular arc centered at the pivot axis of the base to the housing within a second range of angular orientation of the base relative the saw blade beyond said first range, said first circular arc being at a first radial distance from said pivot axis and said second circular arc being at a second radial distance from said pivot axis.

2. The mechanism according to claim 1 wherein:
   - said pivot bracket is formed with an aperture therethrough;
   - said clamping means includes a member extending through said pivot bracket aperture and said adjustment bracket aperture; and
   - said first and second portions of said adjustment bracket aperture are connected at an offset region overlapping said first and second ranges of angular orientation of the base relative the saw blade.

3. The mechanism according to claim 2 wherein said pivot bracket aperture has a portion extending radially in superposition to said first and second portions of said adjustment bracket aperture.

4. The mechanism according to claim 2 wherein said first portion of said adjustment bracket aperture is formed with a stop abutment for said clamping means member at the end of said first range which corresponds to said offset region.

5. The mechanism according to claim 1 wherein said first range is from 90° to 45° and said second range is from 45° to 38.5°.

6. The mechanism according to claim 1 wherein said pivot bracket is mounted on the housing and said adjustment bracket is mounted on the base.

* * * * *